US009248836B2

(12) United States Patent
Johansson et al.

(10) Patent No.: US 9,248,836 B2
(45) Date of Patent: *Feb. 2, 2016

(54) METHOD AND MODULE FOR DETERMINING OF AT LEAST ONE REFERENCE VALUE

(75) Inventors: Oskar Johansson, Stockholm (SE); Maria Södergren, Segeltorp (SE); Fredrik Roos, Segeltorp (SE)

(73) Assignee: SCANIA CV AB (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/367,658

(22) PCT Filed: Dec. 22, 2011

(86) PCT No.: PCT/SE2011/051585
§ 371 (c)(1),
(2), (4) Date: Jun. 20, 2014

(87) PCT Pub. No.: WO2013/095242
PCT Pub. Date: Jun. 27, 2013

(65) Prior Publication Data
US 2015/0210281 A1    Jul. 30, 2015

(30) Foreign Application Priority Data

Dec. 22, 2011   (SE) ...................... 1151271

(51) Int. Cl.
*B60W 30/00*  (2006.01)
*B60W 30/14*  (2006.01)
(Continued)

(52) U.S. Cl.
CPC ............. *B60W 30/143* (2013.01); *B60K 31/00* (2013.01); *B60W 10/06* (2013.01); *B60W 10/11* (2013.01);
(Continued)

(58) Field of Classification Search
None
See application file for complete search history.

(56) References Cited

U.S. PATENT DOCUMENTS 5,839,534 A   11/1998  Chakraborty et al.
5,931,886 A   8/1999   Moroto et al.
(Continued)

FOREIGN PATENT DOCUMENTS

DE    10 2005 045 891       2/2007
DE    10 2009 030 784 A1    2/2010
(Continued)

OTHER PUBLICATIONS

International Search Report mailed Sep. 11, 2012 in corresponding PCT International Application No. PCT/SE2011/051585.
(Continued)

*Primary Examiner* — Jonathan M Dager
(74) *Attorney, Agent, or Firm* — Ostrolenk Faber LLP (57) ABSTRACT

At least one reference value is determined for controlling a vehicle's speed by a method that includes predicting, in a first prediction, a first speed based an engine torque that retards the vehicle as compared with a conventional cruise control along a horizon, and, in a second prediction, a second speed based on an engine torque that accelerates the vehicle as compared with the conventional cruise control; comparing the first and second speeds with a lower limit value and/or an upper limit value which delineate a speed range within which speed is maintained, with an offset added to said lower and/or upper limit values if the vehicle is in a route segment that includes a steep hill; and determining the at least one reference value based on the respective comparisons and the first and second predicted speeds.

24 Claims, 4 Drawing Sheets

(51) Int. Cl.
 *B60K 31/00* (2006.01)
 *B60W 50/00* (2006.01)
 *B60W 10/06* (2006.01)
 *B60W 10/11* (2012.01)
 *B60W 50/06* (2006.01)

(52) U.S. Cl.
 CPC ........... *B60W 50/0097* (2013.01); *B60W 50/06* (2013.01); *B60K 2310/242* (2013.01); *B60W 2540/04* (2013.01); *B60W 2550/142* (2013.01); *B60W 2550/143* (2013.01); *B60W 2550/402* (2013.01); *B60W 2720/10* (2013.01); *B60W 2720/103* (2013.01); *Y02T 10/84* (2013.01)

(56) References Cited

U.S. PATENT DOCUMENTS

| | | | |
|---|---|---|---|
| 5,944,766 A * | 8/1999 | White | B60K 31/047 180/179 |
| 6,076,036 A * | 6/2000 | Price | B60K 31/047 180/170 |
| 6,098,005 A | 8/2000 | Tsukamoto et al. | |
| 6,282,483 B1 | 8/2001 | Yano et al. | |
| 6,374,173 B1 * | 4/2002 | Ehlbeck | B60K 31/047 180/170 |
| 6,782,961 B1 | 8/2004 | Ishikawa et al. | |
| 6,879,902 B2 * | 4/2005 | Nada | B60K 31/042 123/339.14 |
| 6,990,401 B2 | 1/2006 | Neiss et al. | |
| 7,103,460 B1 | 9/2006 | Breed | |
| 7,315,804 B2 | 1/2008 | Sato et al. | |
| 7,400,963 B2 * | 7/2008 | Lee | B60K 31/0066 180/171 |
| 7,460,941 B2 * | 12/2008 | Sychra | B60K 6/46 180/315 |
| 8,260,488 B2 | 9/2012 | Ishikawa et al. | |
| 8,452,509 B2 * | 5/2013 | Sujan | G01C 21/3469 180/165 |
| 8,483,949 B2 * | 7/2013 | Taguchi | B60W 50/085 340/438 |
| 8,504,274 B2 * | 8/2013 | Park | B60W 30/143 701/1 |
| 8,589,045 B2 * | 11/2013 | Seymour | B60T 7/22 303/121 |
| 8,606,513 B2 * | 12/2013 | Chen | B60L 3/12 701/22 |
| 8,620,557 B2 | 12/2013 | Johansson et al. | |
| 8,620,558 B2 | 12/2013 | Johansson et al. | |
| 8,731,788 B2 * | 5/2014 | Sujan | B60W 50/0097 180/169 |
| 8,855,874 B2 * | 10/2014 | Eriksson | B60W 30/143 701/123 |
| 8,996,272 B2 * | 3/2015 | Kim | B60W 30/14 180/170 |
| 8,996,273 B2 * | 3/2015 | Lee | B60W 30/143 701/96 |
| 2002/0173881 A1 * | 11/2002 | Lash | B60K 1/0058 701/1 |
| 2003/0221886 A1 | 12/2003 | Petrie, Jr. | |
| 2004/0068359 A1 * | 4/2004 | Neiss | B60K 31/0058 701/96 |
| 2004/0149106 A1 | 8/2004 | Hess | |
| 2004/0182652 A1 | 9/2004 | Ammon et al. | |
| 2005/0038590 A1 * | 2/2005 | Jung | F02D 29/02 701/93 |
| 2005/0096183 A1 | 5/2005 | Watanabe et al. | 477/182 |
| 2005/0273218 A1 | 12/2005 | Breed et al. | |
| 2005/0274553 A1 * | 12/2005 | Salman | B60K 6/52 180/65.28 |
| 2006/0095195 A1 * | 5/2006 | Nishimura | B60W 30/025 701/96 |
| 2006/0106521 A1 | 5/2006 | Nasr et al. | |
| 2006/0111830 A1 * | 5/2006 | Higashi | B60W 10/06 701/95 |
| 2006/0119507 A1 * | 6/2006 | Cawse | G01C 21/26 342/357.52 |
| 2007/0005218 A1 * | 1/2007 | Ueyama | B60W 30/16 701/96 |
| 2007/0012013 A1 | 1/2007 | Strosser et al. | |
| 2007/0078584 A1 * | 4/2007 | Nakamura | B60T 7/22 701/93 |
| 2007/0112475 A1 * | 5/2007 | Koebler | B60L 3/12 701/1 |
| 2007/0168092 A1 * | 7/2007 | Knox | B60G 17/0165 701/37 |
| 2007/0192013 A1 | 8/2007 | Bando et al. | |
| 2007/0208485 A1 | 9/2007 | Yamamura et al. | |
| 2007/0265759 A1 * | 11/2007 | Salinas | B60T 7/16 701/93 |
| 2008/0033621 A1 | 2/2008 | Nakamura et al. | |
| 2008/0059036 A1 * | 3/2008 | Imai | B60W 30/143 701/93 |
| 2008/0078600 A1 * | 4/2008 | Inoue | B60W 30/16 180/170 |
| 2009/0037069 A1 * | 2/2009 | Inoue | B60W 10/06 701/94 |
| 2009/0118918 A1 | 5/2009 | Heap et al. | |
| 2009/0118920 A1 | 5/2009 | Heap et al. | |
| 2009/0215586 A1 * | 8/2009 | Kresse | B60K 6/365 477/110 |
| 2009/0287388 A1 * | 11/2009 | Bach | B60T 8/245 701/76 |
| 2009/0300067 A1 * | 12/2009 | Denaro | B60W 40/072 |
| 2009/0319126 A1 * | 12/2009 | Miyajima | B60K 31/0066 701/41 |
| 2010/0049400 A1 | 2/2010 | Duraiswamy et al. | 701/35 |
| 2010/0193616 A1 | 8/2010 | Berger et al. | |
| 2010/0198450 A1 * | 8/2010 | Shin | B60W 30/16 701/31.4 |
| 2010/0287073 A1 * | 11/2010 | Kocis | G06Q 10/047 705/28 |
| 2010/0318273 A1 * | 12/2010 | Aleksic | B60K 31/042 701/98 |
| 2011/0088374 A1 * | 4/2011 | Johnson | F01N 3/023 60/285 |
| 2011/0098922 A1 * | 4/2011 | Ibrahim | B60W 40/08 701/532 |
| 2011/0106388 A1 * | 5/2011 | Boeckenhoff | B60W 10/06 701/70 |
| 2011/0208402 A1 * | 8/2011 | Sladek, Jr. | F02D 11/105 701/102 |
| 2011/0208405 A1 | 8/2011 | Tripathi et al. | |
| 2011/0213540 A1 | 9/2011 | Tripathi et al. | |
| 2011/0246042 A1 * | 10/2011 | Tomokuni | B60W 30/143 701/93 |
| 2011/0246043 A1 | 10/2011 | Maruyama | B60W 30/17 701/96 |
| 2011/0276216 A1 * | 11/2011 | Vaughan | B60W 10/06 701/31.4 |
| 2011/0313647 A1 * | 12/2011 | Koebler | B60L 15/2045 701/123 |
| 2012/0010767 A1 * | 1/2012 | Phillips | G01C 21/3469 701/22 |
| 2012/0010768 A1 * | 1/2012 | Phillips | B60L 11/123 701/22 |
| 2012/0083943 A1 * | 4/2012 | Johansson | B60W 10/06 701/1 |
| 2012/0083984 A1 * | 4/2012 | Johansson | B60W 10/06 701/70 |
| 2012/0083985 A1 * | 4/2012 | Johansson | B60W 30/143 701/93 |
| 2012/0083986 A1 * | 4/2012 | Johansson | B60W 30/143 701/93 |
| 2012/0089312 A1 * | 4/2012 | Johansson | B60W 10/06 701/93 |
| 2012/0123651 A1 * | 5/2012 | Johansson | B60W 10/06 701/51 |
| 2012/0150411 A1 | 6/2012 | Oosawa et al. | |
| 2012/0197501 A1 * | 8/2012 | Sujan | B60K 23/00 701/51 |
| 2012/0277940 A1 | 11/2012 | Kumar et al. | |
| 2012/0283928 A1 * | 11/2012 | Bjernetun | B60W 10/06 701/93 |

(56) References Cited

U.S. PATENT DOCUMENTS

| | | | |
|---|---|---|---|
| 2013/0018536 A1* | 1/2013 | Cooper | B61L 3/008 701/20 |
| 2013/0035837 A1* | 2/2013 | Johansson | B60W 10/06 701/98 |
| 2013/0085651 A1* | 4/2013 | Johannsson | B60W 30/143 701/93 |
| 2013/0096792 A1* | 4/2013 | Maier | B60W 10/02 701/65 |
| 2013/0151106 A1* | 6/2013 | Johansson | B60K 31/00 701/93 |
| 2013/0296105 A1* | 11/2013 | Grutter | B60K 6/48 477/5 |
| 2014/0257669 A1* | 9/2014 | Wu | B60W 10/30 701/102 |
| 2014/0277835 A1* | 9/2014 | Filev | G01C 21/3469 701/2 |
| 2014/0277971 A1* | 9/2014 | Oshiro | B60W 50/14 701/51 |
| 2014/0330503 A1* | 11/2014 | Johansson | B60W 50/0097 701/93 |
| 2014/0343818 A1* | 11/2014 | Johansson | B60K 31/00 701/94 |
| 2014/0343819 A1* | 11/2014 | Johansson | B60W 50/0097 701/96 |
| 2014/0350819 A1* | 11/2014 | Johansson | B60K 31/00 701/93 |
| 2014/0350820 A1* | 11/2014 | Johansson | B60K 31/00 701/93 |
| 2014/0350821 A1* | 11/2014 | Johansson | B60W 50/0097 701/93 |
| 2015/0006055 A1* | 1/2015 | Johansson | B60W 40/105 701/93 |
| 2015/0134224 A1* | 5/2015 | Vaughan | B60W 30/143 701/93 |
| 2015/0197247 A1* | 7/2015 | Ichinokawa | B60W 30/143 701/93 |

FOREIGN PATENT DOCUMENTS

| | | |
|---|---|---|
| DE | 10 2008 035 944 A1 | 4/2010 |
| DE | 10 2010 003 428 A1 | 10/2011 |
| EP | 0 838 363 | 4/1998 |
| GB | 2480877 A | 12/2011 |
| JP | 2007-276542 A | 10/2007 |
| WO | WO 2006/107267 A1 | 10/2006 |
| WO | WO 2010/144028 A1 | 12/2010 |
| WO | WO 2010/144030 A1 | 12/2010 |
| WO | WO 2011/126430 A1 | 10/2011 |
| WO | WO 2011/126431 A1 | 10/2011 |
| WO | WO 2011/162705 A1 | 12/2011 |
| WO | WO 2011/162706 A1 | 12/2011 |

OTHER PUBLICATIONS

Erik Hellstrom et al., "Look-ahead control for heavy trucks to minimize trip time and fuel consumption," Control Engineering Practice, 17(2):245-254, 2009.

Sangjun Park et al., "Predictive Eco-Cruise Control: Algorithm and Potential Benefits," 2011 IEEE Forum on Integrated and Sustainable Transportation Systems (FISTS), pp. 394-399, Vienna, Austria, Jun. 29-Jul. 1, 2011.

International Search Report mailed Sep. 7, 2012 in corresponding PCT International Application No. PCT/SE2011/051569.

International Search Report mailed Sep. 7, 2012 in corresponding PCT International Application No. PCT/SE2011/051575.

Erik Hellström, "Explicit use of road topography for model predictive cruise control in heavy trucks," Master's thesis performed in Vehicular Systems, ISRN: LiTH-ISY-EX—05/3660—SE, Linkoping, Feb. 21, 2005.

International Search Re-port mailed Sep. 7, 2012 in corresponding PCT International Application No. PCT/SE2011/051569.

International Search Report mailed Sep. 7, 2012 in corresponding PCT International Application No. PCT/SE2011/051578.

International Search Re port mailed Sep. 7, 2012 in corresponding PCT International Application No. PCT/SE2011/051575.

International Search Report dated Sep. 13, 2012 issued in corresponding International patent application No. PCT/SE2011/051577.

International Search Report mailed Sep. 6, 2012 in corresponding PCT International Application No. PCT/SE2011/051568.

International Search Report dated Sep. 14, 2012 issued in corresponding International patent application No. PCT/SE2011/051570.

Erik Hellström, "Explicit use of road topography for model predictive cruise control in heavy trucks," Master's thesis performed in Vehicular Systems, ISRN: LiTH-ISY-EX--05/3660--SE, Linköping, Feb. 21, 2005.

Maria Ivarsson, "Fuel Optimal Powertrain Control for Heavy Trucks Utilizing Look Ahead," Linköping Studies in Science and Technology, Thesis No. 1400, ISBN 978-91-7393-637-8, SE, Linköping, 2009.

Office Action mailed Mar. 16, 2015 in U.S. Appl. No. 14/364,796.
Office Action mailed Apr. 21, 2015 in U.S. Appl. No. 14/365,361.
Office Action mailed May 6, 2015 in U.S. Appl. No. 14/367,509.
Notice of Allowance mailed Apr. 13, 2015 in U.S. Appl. No. 14/367,465.
Notice of Allowance mailed Apr. 24, 2015 in U.S. Appl. No. 14/365,331.

* cited by examiner

METHOD AND MODULE FOR DETERMINING OF AT LEAST ONE REFERENCE VALUE

CROSS-REFERENCE TO RELATED APPLICATIONS

The present application is a 35 U.S.C. §§371 national phase conversion of PCT/SE2011/051585, filed Dec. 22, 2011, which claims priority of Swedish Application No. 1151271-2, filed Dec. 22, 2011. The contents of both applications are incorporated by reference herein. The PCT International Application was published in the English language.

FIELD OF THE INVENTION

The present invention relates to a method and a module for determination of at least one reference value which indicates how a vehicle's speed is to be influenced and which can be used to control at least one control system of the vehicle, according to the present disclosure.

BACKGROUND TO THE INVENTION

Cruise control is now usual in motor vehicles, e.g. cars, trucks and buses. An object of cruise control is to achieve a uniform predetermined speed. This is done either by adjusting the engine torque to avoid retardation, or by applying braking action on downhill runs where the vehicle is accelerated by its own weight. A more general object of cruise control is to provide convenient driving and better comfort for the vehicle's driver. A driver of a vehicle equipped with cruise control usually chooses a set speed $v_{set}$ as the speed he/she wishes the vehicle to maintain on level roads. A cruise control then supplies an engine system of the vehicle with a reference speed $v_{ref}$ used for control of the engine. The set speed $v_{set}$ may thus be regarded as an input signal to the cruise control, whereas the reference speed $v_{ref}$ may be regarded as an output signal from the cruise control and is used for control of the engine.

Today's traditional cruise control (CC) maintains a constant reference speed $v_{ref}$ usually set by the vehicle's driver in the form of a set speed $v_{set}$ which is thus here a desired speed chosen for example by him/her, and for today's conventional cruise controls the reference speed is constant and equal to the set speed, i.e. $v_{ref}=v_{set}$. The value of the reference speed $v_{ref}$ changes only when adjusted by the driver while the vehicle is in motion. The reference speed $v_{ref}$ is then sent to a control system which controls the vehicle so that its speed corresponds when possible to the reference speed $v_{ref}$. If the vehicle is equipped with an automatic gearchange system, the gears may be changed by that system on the basis of the reference speed $v_{ref}$ to enable the vehicle to maintain the reference speed $v_{ref}$ i.e. to enable it to maintain the desired set speed $v_{set}$.

In hilly terrain, the cruise control system will try to maintain the set speed vset uphill and downhill. This may result inter alia in the vehicle accelerating over the crest of a hill and into a subsequent downgrade. It will then need to be braked to avoid exceeding the set speed $v_{set}$ or will reach a speed $v_{kfb}$ at which the constant speed brake is activated, which is a fuel-expensive way of driving the vehicle. It may also need to be braked downhill to avoid exceeding the set speed $v_{set}$ or the constant speed brake's activation speed $v_{kfb}$ in cases where the vehicle does not accelerate over the crest of the hill.

To reduce fuel consumption, especially on hilly roads, economical cruise controls such as Scania's Ecocruise® have been developed. This cruise control tries to estimate the vehicle's current running resistance and also has information about its historical running resistance. The economical cruise control may also be provided with map data comprising topographical information. The vehicle is then located on the map, e.g. by means of GPS, and the running resistance along the road ahead is estimated. The vehicle's reference speed $v_{ref}$ can thus be optimised for different types of roads in order to save fuel, in which case the reference speed $v_{ref}$ may differ from the set speed $v_{set}$. This specification refers to cruise controls which allow the reference speed $v_{ref}$ to differ from the set speed $v_{set}$ chosen by the driver, i.e. reference speed-regulating cruise controls.

An example of a further development of an economical cruise control is a "look ahead" cruise control (LACC), a strategic form of cruise control which uses knowledge of sections of road ahead, i.e. knowledge of the nature of the road ahead, to determine the reference speed $v_{ref}$. LACC is thus an example of a reference speed-regulating cruise control whereby the reference speed $v_{ref}$ is allowed, within a certain range, to differ from the set speed $v_{set}$ chosen by the driver, in order to achieve more fuel saving.

Knowledge of the road section ahead may for example comprise information about prevailing topology, road curvature, traffic situation, roadworks, traffic density and state of road. It may further comprise a speed limit on the section ahead, and a traffic sign beside the road. Such knowledge is for example available from location information, e.g. GPS (global positioning system) information, map information and/or topographical map information, weather reports, information communicated between vehicles and information provided by radio. All this knowledge may be used in a variety of ways. For example, information about a speed limit on the road ahead may be used to achieve fuel efficiency by lowering the vehicle's speed before reaching a lower speed limit. Similarly, knowledge of a road sign which indicates for example a roundabout or intersection ahead may also be used to achieve fuel efficiency by braking before the vehicle reaches the roundabout or intersection.

An LACC cruise control does for example make it possible, before a steep upgrade, for the reference speed $v_{ref}$ to be raised to a level above the set speed $v_{set}$, since the vehicle will be expected to lose speed on such a climb owing to high train weight relative to engine performance. Similarly, before a steep downgrade, the LACC cruise control makes it possible for the reference speed $v_{ref}$ to be lowered to a level below the set speed $v_{set}$, since the vehicle will be expected to accelerate on such a downgrade owing to its high train weight. The concept here is that reducing the speed at which the vehicle begins the downhill run makes it possible to reduce the energy braked away and/or the air resistance losses (as reflected in the amount of fuel injected before the downgrade). The LACC cruise control may thus reduce fuel consumption without substantially affecting journey time.

Such cruise control systems can be made robust if the topography ahead is made known by the vehicle having map data and GPS. The cruise control system may also alter the vehicle's speed proactively, i.e. before situations arise.

A vehicle usually has a number of ECUs (electronic control units) which control various electronic systems of the vehicle. The vehicle's engine is often controlled by an ECU of its own, called EMS (engine management system). A cruise control's logic may be situated in the EMS but this is sometimes not possible where the EMS has insufficient memory capacity and/or already has a high processor load. If the cruise control's logic is situated in some other ECU than the EMS, reference values, e.g. a desired reference speed $v_{ref}$, have to be sent via CAN (controller area network) to the engine control system's regulator, which then regulates the vehicle's speed on the reference speed $v_{ref}$.

A traditional PID regulator works on the basis of a reference speed $v_{ref}$ received. When this reference speed $v_{ref}$ is altered by the cruise control's logic and is sent via CAN, it is the PID regulator in the engine control system which regulates the vehicle speed towards the reference speed $v_{ref}$. The cruise control logic predicts the vehicle's speed but the regulator in the engine control system tries at the same time to regulate the vehicle's speed, which can lead to problems. It may for example result in maximum torque not being ordered by the engine system at the beginning of a climb despite the cruise control logic having catered for it in the prediction of the reference speed $v_{ref}$. There is therefore risk that the regulator may regulate the engine system with a gradually increasing error.

US 2005/0096183 refers to a speed regulator for a vehicle travelling downhill. The hills concerned are described as having a particular downward gradient, and when the driver operates a gradient switch a constant speed is set for the vehicle for as long as the switch is on. A constant speed is thus set when the driver indicates that the vehicle is on a hill.

U.S. Pat. No. 6,076,036 bases cruise control on a speed setting, the vehicle's current speed, an acceleration and a change in the gradient of the road, which is measured by a sensor, in order to set the fuel flow for lower fuel consumption.

SUMMARY OF THE DISCLOSURE

The object of the present invention is to propose improved cruise control of a vehicle when its speed is to be predicted by the cruise control logic and is at the same time to be regulated by the regulator, and in particular to avoid fuel being unnecessarily injected into the engine because of an unstable control signal to the engine control system.

According to an aspect of the present invention, the objects described above are at least partly achieved by applying the aforesaid method, which is characterised by:

making a first prediction $v_{pred\_Tnew\_ret}$ and a second prediction $v_{pred\_Tnew\_acc}$ of a vehicle speed along a horizon, said first prediction based on an engine torque $T_{ret}$ which retards the vehicle as compared with a conventional cruise control, and said second prediction based on an engine torque $T_{acc}$ which accelerates the vehicle as compared with a conventional cruise control;

comparing said respective first prediction $v_{pred\_Tnew\_ret}$ and second prediction $v_{pred\_Tnew\_acc}$ of the vehicle speed with a lower limit value $v_{min}$ and/or an upper limit value $v_{max}$ which delineate a range within which the vehicle's speed should be, with an offset $v_{offset}$ added to said lower and/or upper limit values $v_{min}$ and $v_{max}$ if the vehicle is in a route segment which comprises a steep hill; and determining at least one reference value based on at least one of said respective comparisons and said first prediction $v_{pred\_Tnew\_ret}$ and second prediction $v_{pred\_Tnew\_acc}$ of the vehicle speed along the horizon.

According to an aspect of the present invention, at least one of the objects described above is achieved by using the aforesaid module for controlling a vehicle's speed, which module is characterised by:

making a first prediction $v_{pred\_Tnew\_ret}$ and a second prediction $v_{pred\_Tnew\_acc}$ of a vehicle speed along a horizon, said first prediction based on an engine torque $T_{ret}$ which retards the vehicle as compared with a conventional cruise control, and said second prediction based on an engine torque $T_{acc}$ which accelerates the vehicle as compared with a conventional cruise control;

comparing said respective first prediction $v_{pred\_Tnew\_ret}$ and second prediction $v_{pred\_Tnew\_acc}$ of the vehicle speed with a lower limit value $v_{min}$ and/or an upper limit value $v_{max}$ which delineate a range within which the vehicle's speed should be, with an offset $v_{offset}$ added to said lower and/or upper limit values $v_{min}$ and $v_{max}$ if the vehicle is in a route segment which comprises a steep hill; and determining at least one reference value based on at least one of said respective comparisons and said first prediction $v_{pred\_Tnew\_ret}$ and second prediction $v_{pred\_Tnew\_acc}$ of the vehicle speed along the horizon.

The invention provides assurance of correct speed setpoint values (reference values) being imparted to the regulator to enable it to follow the prediction of the vehicle's speed. Maximum assurance may thus be afforded of available engine torque on steep upgrades and zero torque/drag torque on steep downgrades. This means that the regulating error affecting the regulator on steep upgrades is sufficient at the beginning of the climb for the engine to be able to deliver maximum torque at that stage in order to avoid the vehicle's speed dropping more than necessary. On steep downhill runs, low constant speed set-point values are provided to be able to avoid injecting fuel into the engine.

The invention also provides a way of improving the performance of a distributed regulating system in which traditional methods of directly influencing the regulator, e.g. disconnection or stronger regulator parameters, are not easy to apply because the set-point value generator and the regulator are situated in different control units.

The invention also affords the advantage of preventing a vehicle's speed from increasing at the crest of a hill in order to reach the vehicle's reference speed before an ensuing downhill run. This speed increase at the crest of a hill generally causes an unnecessary cost.

The invention thus achieves consistent regulation of the vehicle's speed, i.e. no lowering of speed followed by a speed increase at the crest of a hill.

Preferred embodiments of the invention are described herein.

BRIEF DESCRIPTION OF THE ATTACHED DRAWINGS

The invention is described below with reference to the attached drawings, in which.

DETAILED DESCRIPTION OF PREFERRED EMBODIMENTS OF THE INVENTION

Figure 1:
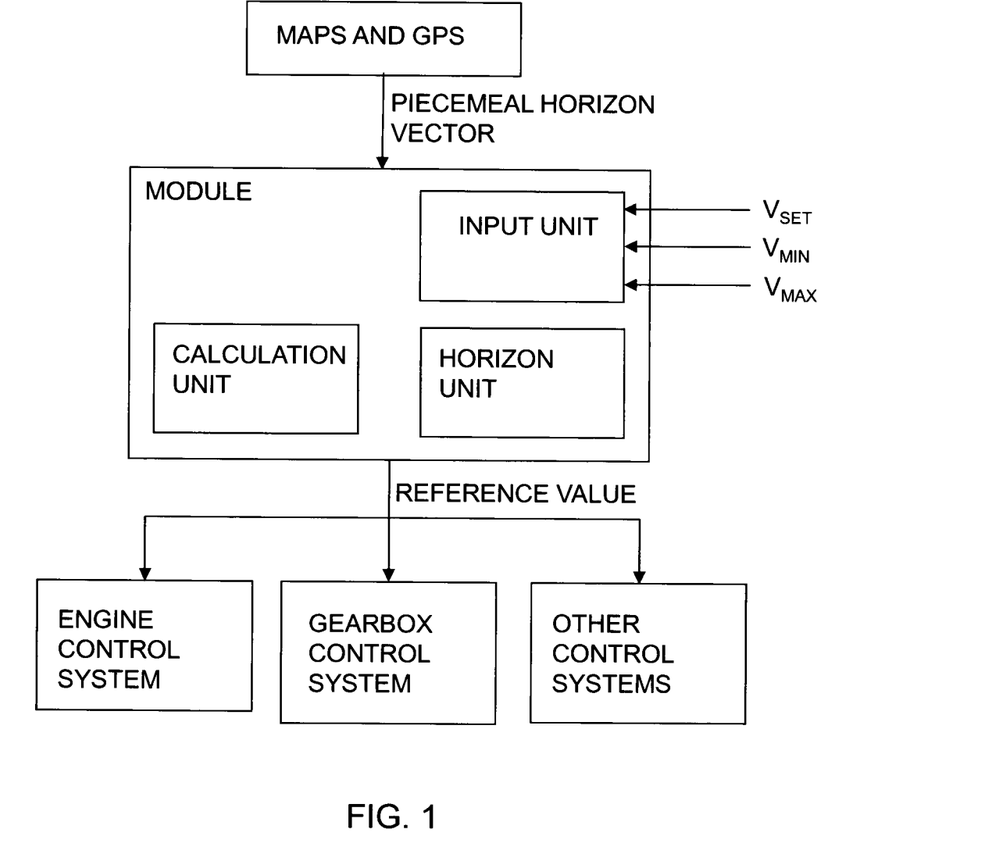
FIG. 1 depicts a module according to an embodiment of the invention.

FIG. 1 depicts a module for controlling a vehicle's speed according to an aspect of the invention. The module comprises an input unit adapted to receiving a desired speed, i.e. a set speed $v_{set}$, for the vehicle. The driver may for example set a speed $v_{set}$ which he/she wishes the vehicle to maintain. The module comprises also a horizon unit adapted to determining a horizon H for the itinerary by means of map data and location data. The horizon H is made up of route segments with at least one characteristic for each segment. A possible example of characteristics of segments is their gradient α, in radians.

The description of the present invention states that GPS (global position system) is used to determine location data for the vehicle, but specialists will appreciate that other kinds of global or regional positioning systems are conceivable to provide these data. Such positioning systems might for example use radio receivers to determine the vehicle's location. The vehicle might also use sensors to scan the surroundings and thereby determine its location.

FIG. 1 illustrates how the module is provided with information about the itinerary from maps (map data) and GPS (location data). The itinerary is sent to the module bit by bit, e.g. via CAN (controller area network) bus. The module may be separate from or be part of the one or more control systems which are to use reference values for regulating. An example of such a control system is the vehicle's engine control system. For example, a horizon is put together for each control system, since the control systems regulate on different parameters. Alternatively, the unit which handles maps and positioning systems may also be part of a system which is to use reference values for regulating. In the module, the bits of the itinerary are then put together in a horizon unit to construct a horizon and are processed by the processor unit to create an internal horizon on which the control system can regulate. The horizon is then continually supplemented by new bits of itinerary from the unit with GPS and map data, to maintain a desired length of horizon. The horizon is thus updated continuously when the vehicle is in motion.

CAN is a serial bus system specially developed for use in vehicles. The CAN data bus makes digital data exchange possible between sensors, regulating components, actuators, control devices etc., and provides assurance that two or more control devices can have access to the signals from a given sensor in order to use them to control components connected to them. Each of the connections between the units illustrated in FIG. 1 may take the form of one or more from among a cable, a data bus, e.g. a CAN (controller area network) bus, an MOST (media orientated systems transport) bus, or some other bus configuration, or a wireless connection.

The module comprises also a calculation unit adapted to making a first prediction $v_{pred\_Tnew\_ret}$ and a second prediction $v_{pred\_Tnew\_acc}$ of a vehicle speed along a horizon, said first prediction based on an engine torque $T_{ret}$ which retards the vehicle as compared with a conventional cruise control, and said second prediction based on an engine torque $T_{acc}$ which accelerates the vehicle as compared with a conventional cruise control. The module is further adapted to comparing said respective first prediction $v_{pred\_Tnew\_ret}$ and second prediction $v_{pred\_Tnew\_acc}$ of the vehicle speed with a lower limit value $v_{min}$ and/or an upper limit value $v_{max}$ which delineate a range within which the vehicle's speed should be, with an offset $v_{offset}$ added to said lower and/or upper limit values $v_{min}$ and $v_{max}$ if the vehicle is in a route segment which comprises a steep hill.

The module is further arranged to determine at least one reference value based on at least one of said respective comparisons and said first prediction $v_{pred\_Tnew\_ret}$ and said second prediction $v_{pred\_Tnew\_acc}$ of the vehicle speed along the horizon.

The module is further arranged to supply, e.g. by sending, to a control system of the vehicle said at least one reference value on which the vehicle is then regulated. How the predictions of the speeds are made will be explained in more detail below.

The module and/or the calculation unit comprise at least a processor and a memory unit which are adapted to making all the calculations, predictions and comparisons of the method according to the invention. Processor means here a processor or microcomputer, e.g. a circuit for digital signal processing (digital signal processor, DSP), or a circuit with a predetermined specific function (application specific integrated circuit. ASIC). The calculation unit is connected to a memory unit which provides it with, for example, the stored programme code and/or stored data which the calculation unit needs to enable it to do calculations. The calculation unit is also adapted to storing partial or final results of calculations in the memory unit.

The method for control of vehicle speed according to the present invention and its various embodiments may also be implemented in a computer programme which, when executed in a computer, e.g. the aforesaid processor, causes the computer to apply the method. The computer programme usually takes the form of a computer programme product stored on a digital storage medium, and is contained in a computer programme product's computer-readable medium which comprises a suitable memory, e.g. ROM (read-only memory), PROM (programmable read-only memory), EPROM (erasable PROM), flash memory, EEPROM (electrically erasable PROM), a hard disc unit, etc.

Figure 2:
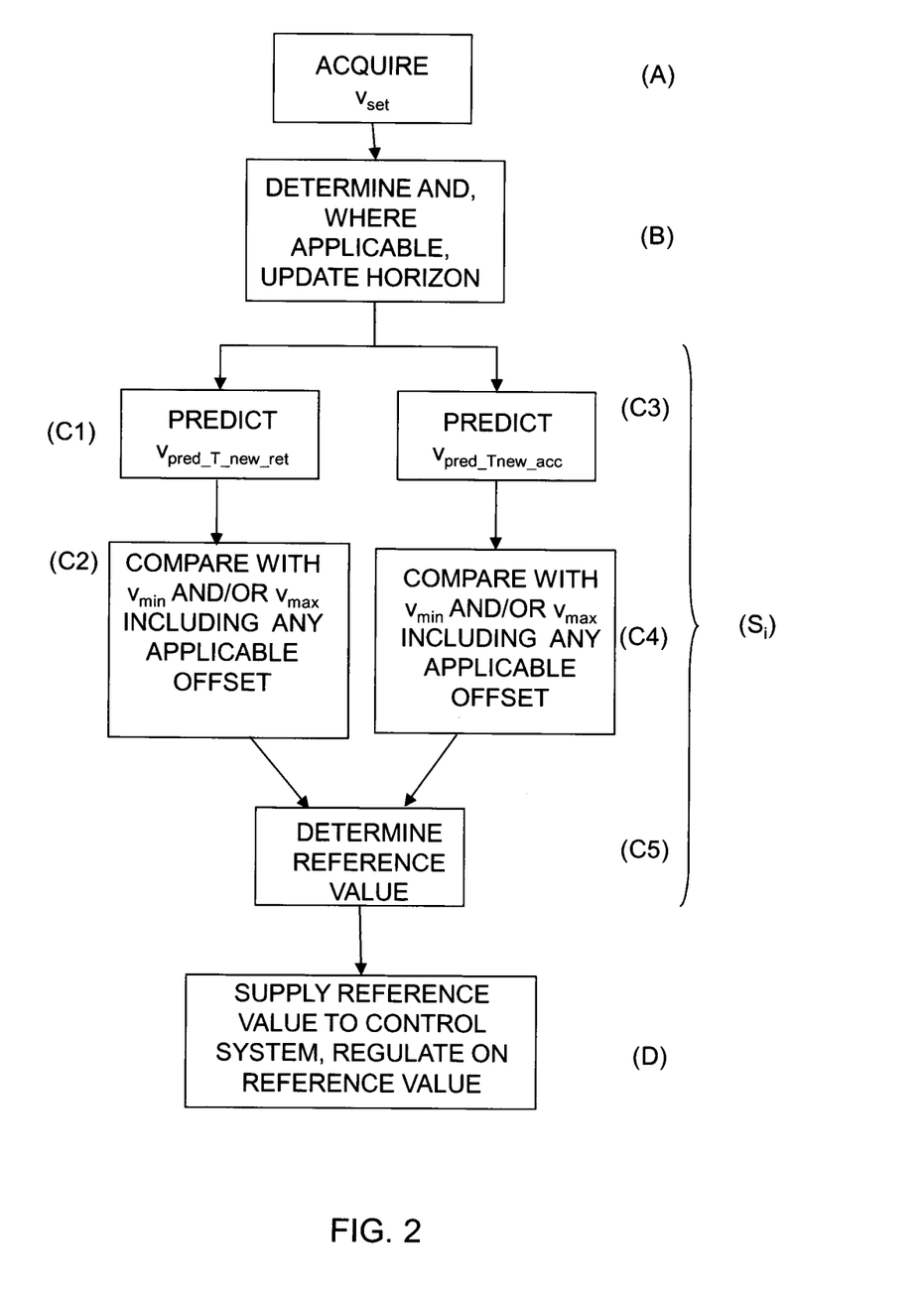
FIG. 2 is a flowchart for the method according to the invention.

FIG. 2 is a flowchart for a method which inter alia comprises steps for the method according to the invention. The diagram comprises not only steps for the determination of reference values according to the invention but also steps for controlling the vehicle's speed according to an embodiment of the invention.

The method comprises a first step A) of acquiring $v_{set}$ as a desired set speed for the vehicle to maintain, and a second step B) of determining a horizon for the itinerary by means of map data and location data comprising route segments with at least one characteristic for each segment.

A number of simulation cycles may be done along the length of the horizon. A simulation cycle $s_j$ may comprise a number N of simulation steps which may be conducted at a predetermined rate f. According to the invention, the following steps are performed during such a simulation cycle $s_j$;

C1) Making a first prediction $v_{pred\_Tnew\_ret}$ of a vehicle speed along a horizon on the basis of an engine torque $T_{ret}$ which retards the vehicle as compared with a conventional cruise control.

C2) Comparing said first prediction $v_{pred\_Tnew\_ret}$ of the vehicle speed with a lower limit value $v_{min}$ and/or an upper limit value $v_{max}$ which delineate a range within which the vehicle's speed should be. Said first prediction thus does not have to be compared here both with the lower limit value $v_{min}$ and with the upper limit value $v_{max}$. Before the comparison, if the vehicle is in a route segment which comprises a steep hill, an offset $v_{offset}$ is here added to said lower limit value $v_{min}$ and/or said upper limit value $v_{max}$.

C3) Making a second prediction $v_{pred\_Tnew\_acc}$ of a vehicle speed along a horizon on the basis of an engine torque $T_{acc}$ which accelerates the vehicle as compared with a conventional cruise control.

C4) Comparing said second prediction $v_{pred\_Tnew\_acc}$ of the vehicle speed with a lower limit value $v_{min}$ and/or an upper limit value $v_{max}$ which delineate a range within which the vehicle's speed should be. Said second prediction thus does not have to be compared here both with the lower limit value $v_{min}$ and with the upper limit value $v_{max}$. Before the comparison, if the vehicle is in a route segment which comprises a steep hill, an offset $v_{offset}$ is here added to said lower limit value $v_{min}$ and/or said upper limit value $v_{max}$. The comparison is thus done on the basis of the lower and upper limit values $v_{min}$ and $v_{max}$, including any applicable offset.

C5) Determining at least one reference value on the basis of at least one of said respective comparisons and said first prediction $v_{pred\_Tnew\_ret}$ and second prediction $v_{pred\_Tnew\_acc}$ of the vehicle speed along the horizon.

As a further step D) said at least one reference value is then supplied, e.g. by being sent via a CAN bus, to a control system of the vehicle in which it is used to regulate the vehicle's speed according to said at least one reference value.

When the vehicle is travelling along the road, the control system is supplied with reference values on which it then regulates the vehicle. According to the invention, when the vehicle's speed is in a route segment which comprises a steep uphill or downhill run, an offset $v_{offset}$ is added in a step C5) to said lower and/or upper limit values $v_{min}$ and $v_{max}$. The vehicle is thereafter regulated on the reference speed $v_{ref}$ at step D) until the end of the steep uphill or downhill run. A reference speed $v_{ref}$ is then again taken from the predicted internal horizon. It is thus possible to compensate for the fact that the cruise control logic is situated in some other control system than the EMS, either by having a large regulating error at the beginning of the uphill run or by having a small regulating error on the downhill run. Applying the invention makes it possible to have a maximum engine torque on steep climbs and to ensure that the vehicle needs only a very small amount of braking on downhill runs.

An embodiment of the invention only allows an offset on the second lower and upper limit values $v_{min}$ and $v_{max}$ when the vehicle's current speed is already outside the range bounded by them.

An example of this is where the vehicle loses speed on an uphill run and is approaching a downhill run. A negative offset on $v_{min}$ is then allowed so that the vehicle can temporarily maintain a lower speed than $v_{min}$ on the downhill run when $v_{pred\_Tnew\_ret}$ indicates that it will accelerate over the set speed $v_{set}$ because of gravitation downhill.

According to another embodiment it is possible in the above example to introduce a margin for the set speed $v_{set}$ so that the maximum value of the first prediction $v_{pred\_Tnew\_ret}$ of the vehicle speed downhill (for the vehicle accelerated by gravitation) will be equal to or above a further upper limit value $v_{max2}$ which is related to a set speed $v_{set}$. According to an embodiment, the further upper limit value $v_{max2}$ corresponds to the set speed plus a constant $c_1$, i.e. $v_{max2}=v_{set}+c_1$. According to another embodiment, the further upper limit value $v_{max2}$ corresponds to a factor $c_1$ multiplied by the set speed $v_{set}$, i.e. $v_{max2}=v_{set}*c_1$. For example, this factor $c_1$ may have the value 1.02, which means that the further upper limit value $v_{max2}$ is 2% higher than the set speed $v_{set}$.

Another example of this is where the vehicle is accelerated by gravitation on a downhill run and then approaches an uphill run. A positive offset on the upper limit value $v_{max}$ is then allowed so that the vehicle can temporarily maintain a higher speed than the upper limit value $v_{max}$ uphill when the second prediction $v_{pred\_Tnew\_acc}$ indicates that its speed will drop to below the set speed $v_{set}$ on the uphill run.

According to another embodiment it is possible in the above example to introduce a margin for the set speed $v_{set}$ so that the minimum value of the second prediction $v_{pred\_Tnew\_acc}$ of the vehicle speed uphill (for the vehicle losing speed uphill because of gravitation) will be equal to or below a further lower limit value $v_{min2}$ which relates to the set speed $v_{set}$. According to an embodiment, the further lower limit value $v_{min2}$ corresponds to the set speed minus a constant $c_2$, i.e. $v_{min2}=v_{set}-c_2$. According to another embodiment, the further lower limit value $v_{min2}$ corresponds to a factor $c_2$ multiplied by the set speed $v_{set}$, i.e. $v_{min2}=v_{set}*c_2$. This factor $c_2$ may for example have the value 0.98, which means that the further lower limit value $v_{max2}$ is 2% lower than the set speed $v_{set}$. An example of a typical value for the offset $v_{offset}$ is 5 km/h, but any other suitable values may be employed if they achieve the object of the invention.

According to an embodiment of the invention, the offset $v_{offset}$ has a positive value when the vehicle is in a route segment which comprises a steep upgrade. According to this embodiment, a positive offset is added to said lower and/or upper limit values $v_{min}$ and $v_{max}$ when the vehicle is on a steep uphill run. The reference speed $v_{ref}$ supplied to the vehicle's control system is therefore taken as the reference speed $v_{ref}$ calculated by the control system on the basis of said lower and/or upper limit values $v_{min}$ and $v_{max}$ plus the offset, i.e. $v_{min}+v_{offset}$ and $v_{max}+v_{offset}$, when the vehicle is on a steep uphill run. Maximum engine torque is thus assured on steep climbs.

According to an embodiment of the present invention, the offset $v_{offset}$ has a negative value when the vehicle is in a route segment which comprises a steep downgrade. In a similar way to on steep upgrades, when the vehicle is on a steep downgrade a negative offset $v_{offset}$ is therefore added to said lower and/or upper limit values $v_{min}$ and $v_{max}$. The reference speed $v_{ref}$ with which the vehicle's control system is provided is then taken as the reference speed $v_{ref}$ calculated by the control system on the basis of said lower and/or upper limit values $v_{min}$ and $v_{max}$ plus $-|v_{offset}|$, i.e. $v_{min}-|v_{offset}|$ and $v_{max}-|v_{offset}|$, when the vehicle is on a steep downhill run. This provides assurance of zero torque or drag torque on steep downgrades to avoid having to brake downhill.

According to an embodiment, the value of the offset $v_{offset}$ is variable over time in order to be able to meet performance and comfort criteria which vary over time. For example, the offset $v_{offset}$ may be reduced (ramped down) towards zero at the end of a steep climb in order to avoid jerking due to rapid changes in the reference speed $v_{ref}$. Similarly, the offset $v_{offset}$ may be reduced (ramped down) towards zero at the end of a steep downhill run.

According to the invention, to avoid consuming unnecessary amounts of fuel when a first steep upgrade or a first steep downgrade is followed by a steep upgrade or a steep downgrade within a certain distance L, neither acceleration nor retardation of the vehicle are allowed within section L.

In other words, only one out of acceleration and retardation is allowed within section L in cases where L defines the distance between a steep upgrade and a subsequent steep downgrade. Similarly, only one out of acceleration and retardation is allowed within section L in cases where L defines the distance between a steep downgrade and a subsequent steep upgrade.

According to an embodiment, the length of section L depends on the vehicle's speed and/or an applied driving mode. For example, a mode chosen by the driver may decide the length of section L and consequently also how the vehicle's speed is to be regulated.

Figure 3:
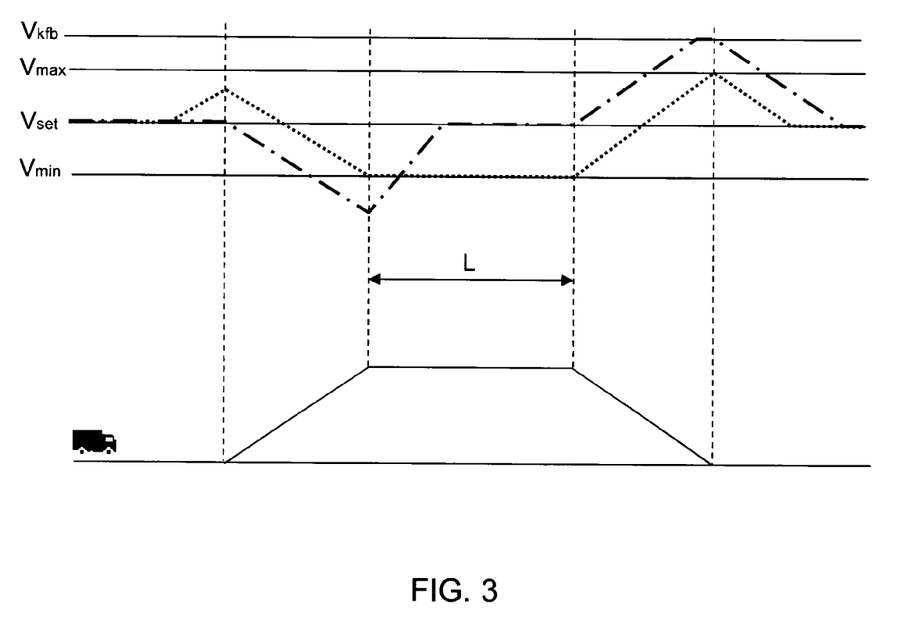
FIG. 3 illustrates the difference between the invention and a traditional cruise control according to an embodiment of the invention.
Figure 4:
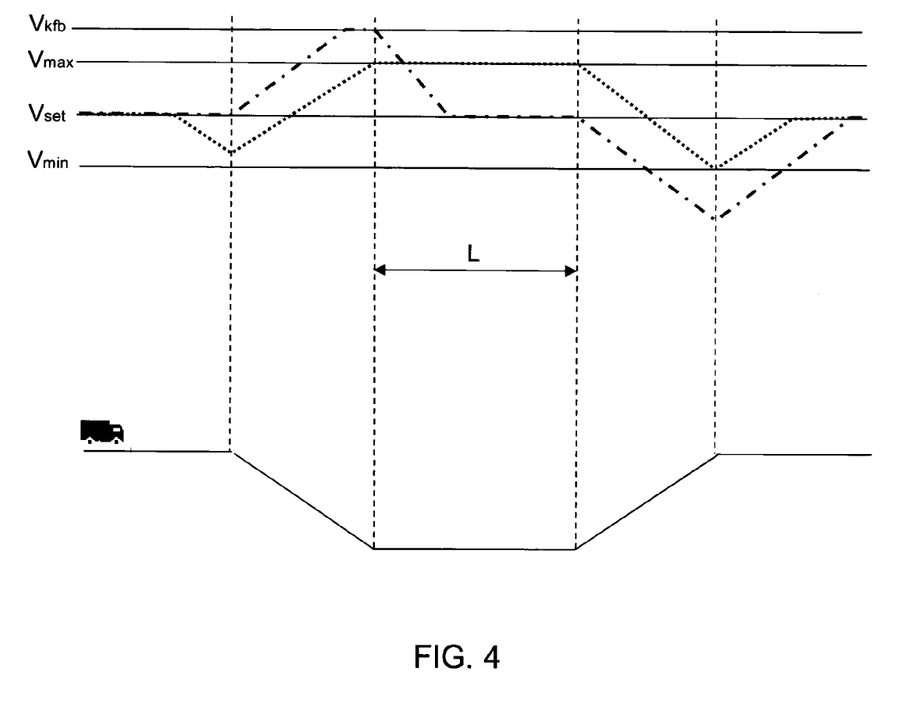
FIG. 4 illustrates the difference between the invention and a traditional cruise control according to an embodiment of the invention.

Thus according to these embodiments, only one out of acceleration and retardation takes place before the next hill. FIGS. 3 and 4 illustrate schematically a non-limitative example of these embodiments.

A conventional cruise control is represented by a chain-dotted line, and cruise control according to these embodiments of the invention by a dotted line. Section L is here specified as having a certain length which is less than a predetermined threshold value. According to an embodiment, the threshold value here is 250-500 m. Section L may for example be determined by adding up the lengths of the route segments which are situated between the hills.

When the vehicle has climbed the hill in FIG. 3, the reference speed $v_{ref}$ is taken as equal to the lower limit value $v_{min}$ before the next hill. This speed $v_{min}$ is then maintained throughout section L, i.e. until the vehicle is on, for example, a steep downgrade. This avoids increasing the speed of the vehicle, which is what a conventional cruise control would do, since the vehicle would then endeavour to maintain the set speed $v_{set}$ before subsequently lowering its speed again in order to be able to take advantage of the energy arising on the downhill run. Downhill braking of the vehicle may thus be avoided.

When the vehicle runs with conventional cruise control (chain-dotted line) more energy will have to be braked away downhill, as illustrated in the diagram, in which $v_{kfb}$ represents the retarder speed brake's speed setting (constant speed brake speed). The vehicle's constant speed brake therefore acts when this speed is exceeded.

Similarly, energy is saved by maintaining a constant speed on section L as illustrated in FIG. 4. When the vehicle has traveled down the hill in FIG. 4, the reference speed $v_{ref}$ is taken as equal to the upper limit value $v_{max}$ before the next climb. This speed is then maintained throughout section L, i.e. until the vehicle is on, for example, a steep upgrade. This avoids its speed dropping before the climb, which is what would happen with a conventional cruise control, since the vehicle would then endeavour to maintain the set speed $v_{set}$.

The invention comprises also the aforesaid module for determination of reference values for a vehicle's control system as illustrated in FIG. 1. This module is arranged to perform all the method steps described above for the various embodiments of the invention. The invention thus proposes a module which can be used in a vehicle to regulate reference values robustly and safely where the module is in some other ECU than the vehicle's ECU, i.e. EMS. The module may be part of a control system whose reference values/set-point values it is intended to regulate, or be a freestanding module separate from the control system.

According to an embodiment of the invention, threshold values which are used by the invention, e.g. the aforesaid threshold values for section L, are determined in the calculation unit on the basis of vehicle-specific values, e.g. current transmission ratio, current vehicle weight, maximum torque curve, mechanical friction and/or the vehicle's running resistance at current speed. Threshold values used by the present invention may also be determined at least partly on the basis of choice of driving mode by the vehicle's driver. Thus the threshold values may be determined on the basis of the vehicle's state at the time and/or on the basis of driving mode choice by the driver. Necessary signals for determining these values may be obtained from CAN or be monitored by any appropriate sensors.

According to an embodiment, the characteristics of route segments comprise their length and gradient, and the calculation unit is adapted to calculating gradient threshold values $l_{min}$ and $l_{max}$. Thus the vehicle's speed can be regulated on the undulations of the road ahead in order to travel in a fuel-economising way.

The horizon unit is preferably adapted to determining the horizon continuously along a planned itinerary for the vehicle on which the calculation unit is adapted to continuously performing steps to calculate and update reference values for the control system for the whole length of the internal horizon. In an embodiment, the horizon is therefore constructed bit by bit as the vehicle travels along the road ahead. The set-point values/reference values for the control system are calculated and updated continuously irrespective of whether new route segments are added or not, since the references to be calculated depend also on how values specific to the vehicle change along the itinerary.

The present invention is not restricted to the embodiments described above. Various alternatives, modifications and equivalents may be used. The aforesaid embodiments therefore do not limit the invention's scope which is defined by the attached claims.

The invention claimed is:

1. A method for determination of at least one reference value for a speed regulator that controls a speed of a vehicle such that said reference value may differ from a value corresponding to the speed indicated by a driver of the vehicle, the method comprising:
    making, by a module comprising an automated processor, a first prediction and a second prediction of the speed of the vehicle along a horizon, said first prediction based on an engine torque which retards the vehicle as compared with speed regulator in which the reference value equals the speed indicated by the driver, and said second prediction based on an engine torque which accelerates the vehicle as compared with the speed regulator in which the reference value equals the speed indicated by the driver;
    comparing said first predicted speed and said second predicted speed, respectively, with a lower limit value and/or an upper limit value, wherein the lower and upper limit values delineate a speed range within which the speed is maintained, with an offset added to said lower and/or upper limit values when the vehicle is in a route segment having a steep hill route characteristic;
    determining the at least one reference value based on at least one of said comparisons and said first predicted speed and said second predicted speed; and
    outputting the at least one reference value to a vehicle control system for controlling the speed of the vehicle.

2. A method according to claim 1, wherein said offset is positive when the vehicle is in a route segment having a steep upgrade route characteristic.

3. A method according to either of claim 1, wherein said offset is negative when the vehicle is in a route segment having a steep downgrade route characteristic.

4. A method according to any one of claim 1, wherein the value of said offset varies over time.

5. A method according to claim 1, wherein the value of said offset is at least partly based on a driving mode received from a system of the vehicle.

6. A method according to claim 5, wherein said driving mode is chosen by a driver of the vehicle.

7. A method according to claim 1, wherein only one of acceleration and retardation is allowed within a first section where a steep upgrade is followed by a steep downgrade within the length of the first section from said steep upgrade.

8. A method according to claim 1, wherein only one of acceleration and retardation is allowed within a first section where a steep downgrade is followed by a steep upgrade within the length of the first section from said steep downgrade.

9. A method according to claim 7, wherein the length of the first section depends on at least one of:
    the speed, and
    a driving mode applied.

10. A method according to claim 1, wherein an offset to the respective lower and upper limit values is allowed when a current speed of the vehicle is outside the speed range bounded by the lower and upper limit values and when the first predicted speed or the second predicted speed indicates that the speed indicated by the driver will be reached by imparting the reference value which resulted in the first predicted speed or second predicted speed.

11. A module configured to determine at least one reference value for a speed regulator that controls a speed of a vehicle by a control system of a vehicle such that said reference value may differ from a value corresponding to the speed indicated by a driver of the vehicle, the module comprising:
a calculation unit configured:
to make a first prediction and a second prediction of a vehicle speed along a horizon, said first prediction based on an engine torque which retards the vehicle as compared with the speed regulator in which the reference value equals the speed indicated by the driver, and said second prediction based on an engine torque which accelerates the vehicle as compared with the speed regulator in which the reference value equals the speed indicated by the driver;
to compare said first predicted speed and said second predicted speed, respectively, with a lower limit value and/or an upper limit value, wherein the lower and upper limit values delineate a range within which the speed is maintained, with an offset added to at least one of said lower and upper limit values when the vehicle is in a route segment having a steep hill route characteristic; and
to determine the at least one reference value based on said respective comparisons and/or said first predicted speed and said second predicted speed; and
said module configured to output the at least one reference speed determined to the control system of the vehicle.

12. A module according to claim 11, wherein said offset is positive when the vehicle is in a route segment having a steep upgrade route characteristic.

13. A module according to claim 11, wherein said offset is negative when the vehicle is in a route segment a steep downgrade route characteristic.

14. A module according to claim 11, wherein the value of said offset varies over time.

15. A module according to claim 11, wherein the value of said offset is at least partly based on a driving mode received from a system of the vehicle.

16. A module according to claim 15, further comprising an input unit configured to receive said driving mode chosen by a driver of the vehicle.

17. A module according to claim 11, wherein the calculation unit is configured to allow only one of acceleration and retardation within a first section where a steep upgrade is followed by a steep downgrade within the length of the first section from said steep upgrade.

18. A module according to claim 11, wherein the calculation unit is adapted to allowing only one out of acceleration and retardation within the first section where a steep downgrade is followed by a steep upgrade within the length of the first section from said steep downgrade.

19. A module according to claim 17, wherein the length of the first section depends on at least one of:
the speed, and
a driving mode received.

20. A module according to claim 11, wherein the calculation unit is configured to determine threshold values which are used in the control of the speed based on at least one of a current transmission ratio, a current vehicle weight, a maximum torque curve for an engine of the vehicle, a mechanical friction and a running resistance at current speed of the vehicle.

21. A module according to claim 11, wherein the calculation unit is configured to calculate threshold values in the form of gradient threshold values.

22. A module according to claim 11, wherein an offset to each of the lower and upper limit values is allowed when a current speed is outside the speed range bounded by the lower and upper limit values and when the first predicted speed or the second predicted speed indicates that the speed indicated by the driver will be reached by imparting the reference value which resulted in the first predicted speed or the second predicted speed.

23. A non-transitory computer-readable medium incorporating instructions for enabling a vehicle to control a speed of the vehicle when the instructions are run on an automated processor, the instructions comprising:
prediction instructions configured to make a first prediction and a second prediction of the speed of the vehicle along a horizon, said first prediction based on an engine torque which retards the vehicle as compared with speed regulator in which the reference value equals the speed indicated by the driver, and said second prediction based on an engine torque which accelerates the vehicle as compared with the speed regulator in which the reference value equals the speed indicated by the driver;
comparison instructions configured to compare said first predicted speed and said second predicted speed, respectively, with a lower limit value and/or an upper limit value, wherein the lower and upper limit values delineate a speed range within which the speed is maintained, with an offset added to said lower and/or upper limit values when the vehicle is in a route segment having a steep hill route characteristic;
reference value determination instructions configured to determine the at least one reference value based on at least one of said comparisons and said first predicted speed and said second predicted speed; and
outputting instructions configured to output the at least one reference value to a vehicle control system for controlling the speed of the vehicle.

24. A vehicle comprising the module of claim 11.

* * * * *